United States Patent
Bold et al.

(10) Patent No.: US 9,870,603 B1
(45) Date of Patent: Jan. 16, 2018

(54) IMAGE INTEGRITY MONITOR SYSTEM AND METHOD

(71) Applicant: Rockwell Collins, Inc., Cedar Rapids, IA (US)

(72) Inventors: Peter H. Bold, Portland, OR (US); Weston J. Lahr, Sherwood, OR (US); Jared R. Prink, Newberg, OR (US); Nathaniel S. Kowash, Newberg, OR (US); Robert B. Wood, Beaverton, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/227,715

(22) Filed: Aug. 3, 2016

(51) Int. Cl.
| G06K 9/40 | (2006.01) |
| G06T 5/00 | (2006.01) |
| H04N 5/357 | (2011.01) |
| B64D 43/00 | (2006.01) |

(52) U.S. Cl.
CPC .............. *G06T 5/001* (2013.01); *B64D 43/00* (2013.01); *H04N 5/357* (2013.01)

(58) Field of Classification Search
USPC ........................................................ 382/275
See application file for complete search history.

(56) References Cited

U.S. PATENT DOCUMENTS

| 5,319,445 A * | 6/1994 | Fitts ..................... G01B 11/254 250/237 G |
| 6,425,867 B1 * | 7/2002 | Vaezy .................. A61B 8/0833 600/439 |
| 8,547,456 B1 | 10/2013 | Zimmerman et al. |
| 2006/0061746 A1 * | 3/2006 | Kok ..................... G03F 7/70666 355/53 |
| 2011/0235898 A1 * | 9/2011 | Watanabe ................. G06T 7/33 382/154 |
| 2012/0050829 A1 * | 3/2012 | Sasaki ................ H04N 1/40056 358/530 |
| 2012/0199751 A1 * | 8/2012 | Watanabe ................. H04N 5/32 250/370.09 |
| 2015/0365563 A1 * | 12/2015 | Sato ......................... H04N 1/46 358/474 |
| 2016/0219221 A1 * | 7/2016 | Yachi ....................... G01C 3/06 |
| 2017/0227912 A1 * | 8/2017 | Iino ......................... G03G 15/70 |

FOREIGN PATENT DOCUMENTS

WO WO2008080321 * 7/2008 ............. H04N 5/217

* cited by examiner

*Primary Examiner* — Jerome Grant, II
(74) *Attorney, Agent, or Firm* — Angel N. Gerdzhikov; Donna P. Suchy; Daniel M. Barbieri

(57) ABSTRACT

Systems and methods for monitoring integrity of image sensing devices are disclosed. The method may include: obtaining a characterized noise pattern of an image sensing device; determining whether an image generated by the image sensing device is misaligned with an actual scene based on the characterized noise pattern of the image sensing device; in response to the image being determined to be misaligned with the actual scene, discarding or re-aligning the image; and in response to the image being determined to be aligned with the actual scene, presenting the image to a user.

16 Claims, 3 Drawing Sheets

IMAGE INTEGRITY MONITOR SYSTEM AND METHOD

BACKGROUND

Enhanced vision is a technology that incorporates information collected from one or more image sensing devices (e.g., sensors and/or cameras) to help enhance a user's natural vision. Systems supporting enhanced vision can be used in a variety of applications. Vehicles such as aircraft and the like, for instance, may utilize enhanced vision systems to help enhance pilot situational awareness and/or additional operational capabilities.

Enhanced vision systems may need to provide certain levels of image integrity for them to be used in safety critical applications. An enhanced vision system installed on an aircraft, for example, may need to ensure that images produced by its image sensing devices do not provide hazardously misleading information to the pilot.

SUMMARY

In one aspect, embodiments of the inventive concepts disclosed herein are directed to a method. The method may include: obtaining a characterized noise pattern of an image sensing device; determining whether an image generated by the image sensing device is misaligned with an actual scene based on the characterized noise pattern of the image sensing device; in response to the image being determined to be misaligned with the actual scene, discarding or re-aligning the image; and in response to the image being determined to be aligned with the actual scene, presenting the image to a user.

In a further aspect, embodiments of the inventive concepts disclosed herein are directed to an apparatus. The apparatus may include a processor in communication with an image sensing device. The processor may be configured to: obtain a characterized noise pattern of the image sensing device; determine whether an image generated by the image sensing device is misaligned with an actual scene based on the characterized noise pattern of the image sensing device; in response to the image being determined to be misaligned with the actual scene, discard or re-align the image; and in response to the image being determined to be aligned with the actual scene, process the image to present to a user.

In another aspect, embodiments of the inventive concepts disclosed herein are directed to a system. The system may include an image sensing device, a display, and a processor in communication with the image sensing device and the display. The processor may be configured to: obtain a characterized noise pattern of the image sensing device; determine whether an image generated by the image sensing device is misaligned with an actual scene based on the characterized noise pattern of the image sensing device; in response to the image being determined to be misaligned with the actual scene, discard or re-align the image; and in response to the image being determined to be aligned with the actual scene, process the image to present to a user.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
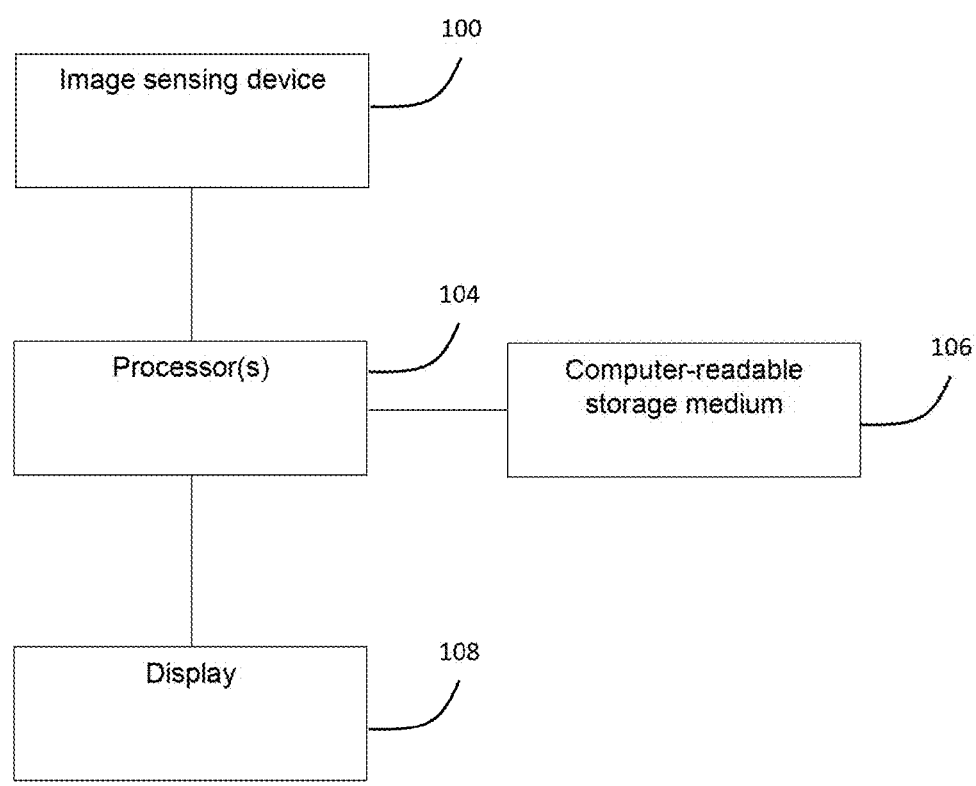
FIG. 1 is a block diagram depicting an exemplary system configured to monitor the integrity of an image sensing device according to an exemplary embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following:

A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments of the inventive concepts disclosed herein are directed to systems and methods for monitoring integrity of image sensing devices (e.g., sensors and/or cameras). The image sensing devices may be configured as stand-alone imaging systems or as components of enhanced vision systems, which may utilize the image sensing devices to obtain images of various scenes. It is noted that the images obtained by the image sensing devices may be shifted/misaligned after image sensing due to various reasons, and if the misaligned images are presented to a user operating a safety critical application (e.g., if misaligned images of a runway are presented to assist landing of an aircraft), the result may impact safety. It is therefore contemplated that by providing the abilities to monitor the integrity of such image sensing devices, presentation of misaligned images may be effectively avoided, which may be appreciated in various types of applications, and especially in safety critical applications.

Figure 2:
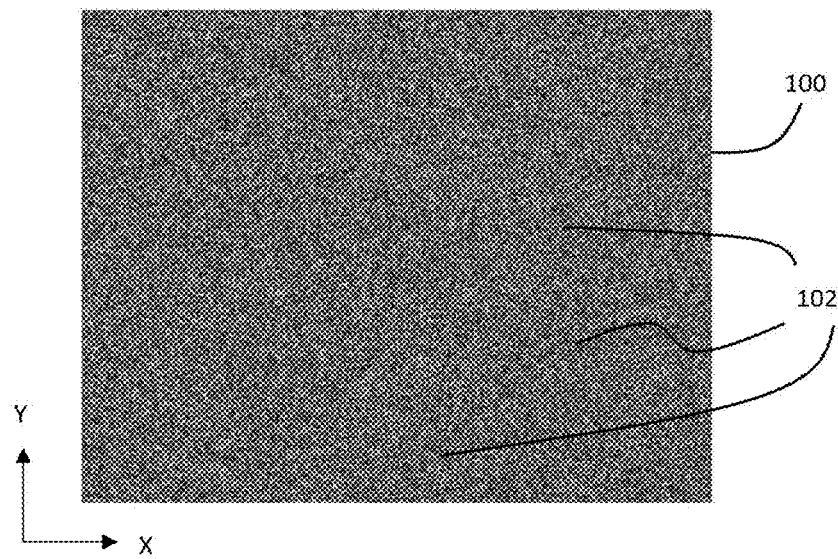
FIG. 2 is an illustration depicting a raw image generated by an exemplary image sensing device when the exemplary image sensing device is exposed to a flat field.
Figure 3:
FIG. 3 is an illustration depicting a raw image generated by an exemplary image sensing device.
Figure 4:
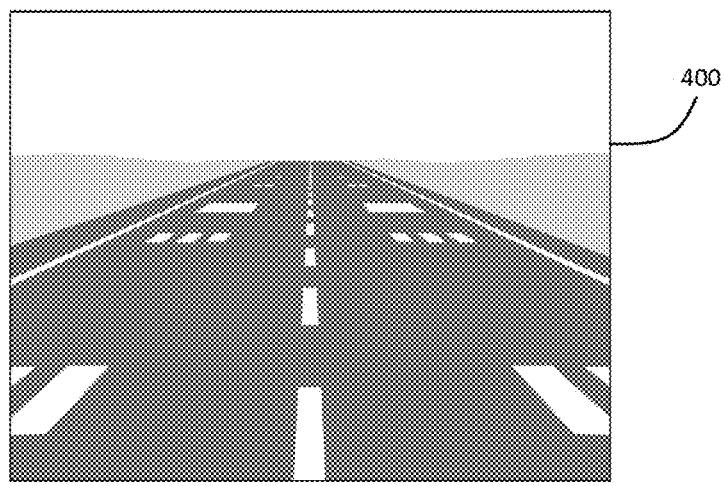
FIG. 4 is an illustration depicting a noise pattern corrected image obtained by applying correction terms to the image shown in FIG. 3.

Referring generally to FIGS. 1-4. FIG. 1 is a block diagram depicting an exemplary image sensing device 100 and FIGS. 2-4 are illustrations depicting an exemplary image generation process performed by the image sensing device 100. The image sensing device 100 may include an array (e.g., a focal plane array) of pixels 102. The array of pixels 102 may have inherent row, column, or pixel imbalances (e.g., resulting from the manufacturing process), which may lead to the formation of a certain noise pattern (e.g., as shown in FIG. 2). This noise pattern may be characterized by exposing the image sensing device 100 to a flat field. It is noted that since this noise pattern is relatively stable, this noise pattern may only need to be characterized once. It is contemplated, however, that the noise pattern may be characterized periodically and/or intermittently without departing from the broad scope of the inventive concepts disclosed herein.

The noise pattern may be corrected using correction terms (e.g., gain and offset terms, as well as other applicable non-linear corrections and characterized correction functions) on a pixel by pixel basis. For instance, an image 300 as shown in FIG. 3 may be obtained using the image sensing device 100, and may contain the noise pattern, which may be corrected with the application of the correction terms to produce a noise pattern corrected image 400 as shown in FIG. 4. For illustrative purposes, the image 300 may be referred to as the uncorrected (or raw) image 300.

It is noted that the noise pattern contained in the raw image 300 may be utilized advantageously to help determine whether the raw image 300 is properly aligned with the actual scene. For instance, referring back to FIG. 1, one or more processors 104 (which may include dedicated processing units, application-specific integrated circuits (ASICs), field-programmable gate arrays (FPGAs) or various other types of processors or processing units) communicatively coupled to the image sensing device 100 may be configured to obtain the noise pattern of the image sensing device 100 and determine whether a raw image generated by the image sensing device 100 is misaligned with an actual scene based on the noise pattern observed in the raw image. Because the noise pattern is an inherent property of the image sensing device 100, the noise pattern can be utilized as a reference to help evaluate the relationships of pixel neighborhoods or to compare to the mean of the raw image. If the noise pattern indicates that a pixel or a set of pixels located at or around $(x_i, y_j)$ is supposed to exhibit a particular pattern, a shift of that particular pattern observed in the noise pattern of the raw image with respect to the noise pattern of the image sensing device 100 may indicate that the raw image has been shifted and is now misaligned with the actual scene.

In response to the determination that the raw image is misaligned, the raw image may be discarded (e.g., to prevent the raw image from being presented to a user). Alternatively and/or additionally, in some embodiments, the amount of misalignment (e.g., in both x and y directions) may be quantified at least partially based on the noise pattern observed in the raw image and the noise pattern of the image sensing device 100, allowing the image to be shifted (re-aligned) to compensate for the misalignment. On the other hand, if the raw image is determined to be properly aligned, the processor(s) 104 may apply the correction terms (instructions of which may be provided by the manufacturer of the image sensing device 100 and stored in a computer-readable storage medium 106) to help remove the noise pattern from the raw image for it to be presented to a user via a display (e.g., a head mounted/worn display, a head up display, or a head down display) 108. It is contemplated that the processor(s) 104 may be configured to carry out the process describe above periodically, continuously, intermittently, in response to a predetermined event, in response to a user request or command, or combinations thereof.

It is contemplated that the image sensing device 100, the processor(s) 104, the computer-readable storage medium 106, and the display 108 may form an enhanced vision system, which may be adapted to be installed on a vehicle (e.g., an aircraft). It is to be understood, however, that the specific references to enhanced vision systems and aircraft in the examples above are merely illustrative and are not meant to be limiting. It is contemplated that systems and methods configured in accordance with embodiments of the inventive concepts disclosed herein may be utilized in various types of systems and applications without departing from the broad scope of the inventive concepts disclosed herein.

Figure 5:
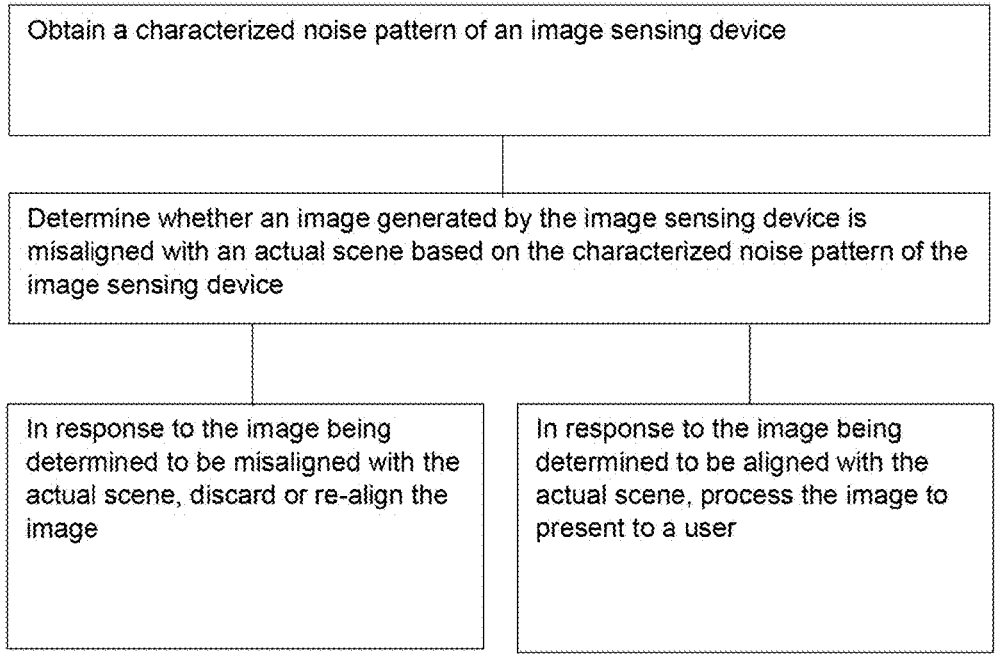
FIG. 5 is a flow diagram depicting an exemplary method configured for monitoring the integrity of an image sensing device according to an exemplary embodiment of the inventive concepts disclosed herein.

Referring now to FIG. 5, a flow diagram depicting a method 500 for determining whether an image generated by an image sensing device is properly aligned with an actual scene is shown. A noise pattern of the image sensing device may be obtained (e.g., received from the manufacturer of the image sensing device or characterized by testing the image sensing device in a control setting) in a step 502. If the noise pattern indicates that a pixel or a set of pixels located at or around ($x_i$, $y_j$) is supposed to exhibit a particular pattern, a shift of that particular pattern observed in the noise pattern of the image with respect to the noise pattern of the image sensing device may indicate that the image has been shifted and is now misaligned with the actual scene. Therefore, in some embodiments, if the image is determined to be misaligned with the actual scene in a step 504, the image may be discarded in a step 506 to prevent the image from being presented to a user (effectively avoiding presentation of hazardously misleading information caused by misalignment). Alternatively and/or additionally, in some embodiments, the amount of misalignment (e.g., in both x and y directions) may be quantified at least partially based on the noise pattern observed in the image and the noise pattern of the image sensing device, allowing the image to be shifted (re-aligned) to compensate for the misalignment. On the other hand, if the image is determined to be properly aligned, the image may be allowed to be presented to the user in a step 508.

As will be appreciated from the above, systems and methods configured in accordance with embodiments of the inventive concepts disclosed herein are able to provide the abilities to monitor the integrity of images generated by image sensing devices and avoid presentation of misaligned images, which may be a feature that is appreciated (or even required) in various types of applications.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form hereinbefore described being merely an explanatory embodiment thereof, it is the intention of the following claims to encompass and include such changes.

What is claimed is:

1. A method, comprising:
   obtaining a characterized noise pattern of an image sensing device;
   determining whether an image generated by the image sensing device is misaligned with an actual scene based on the characterized noise pattern of the image sensing device;
   in response to the image being determined to be misaligned with the actual scene, discarding or re-aligning the image; and
   in response to the image being determined to be aligned with the actual scene, presenting the image to a user, wherein re-aligning the image further comprises quantifying a misalignment between a noise pattern observed in the image generated by the image sensing device and the characterized noise pattern of the image sensing device.

2. The method of claim 1, further comprising:
   in response to the image being determined to be aligned with the actual scene, applying predetermined correction terms to the image to produce a noise pattern corrected image; and
   presenting the noise pattern corrected image to the user.

3. The method of claim 1, wherein the determining whether the image generated by the image sensing device is misaligned with the actual scene comprises:
   determining whether a noise pattern observed in the image generated by the image sensing device is shifted with respect to the characterized noise pattern of the image sensing device.

4. The method of claim 1, wherein re-aligning the image further comprises:
   shifting the image generated by the image sensing device to compensate for the misalignment.

5. An apparatus, comprising:
   at least one processor in communication with an image sensing device, the at least one processor configured to:
   obtain a characterized noise pattern of the image sensing device;
   determine whether an image generated by the image sensing device is misaligned with an actual scene based on the characterized noise pattern of the image sensing device;
   in response to the image being determined to be misaligned with the actual scene, discard or re-align the image; and
   in response to the image being determined to be aligned with the actual scene, process the image to present to a user, wherein the at least one processor is further configured to:
   apply predetermined correction terms to the image generated by the image sensing device to produce a noise pattern corrected image; and
   provide the noise pattern corrected image to a display configured to present the noise pattern corrected image to the user, the predetermined correction terms are stored in at least one computer-readable storage medium accessible to the at least one processor.

6. The apparatus of claim 5, wherein in response to the image being determined to be misaligned with the actual scene, the at least one processor is further configured to:
   quantify a misalignment between a noise pattern observed in the image generated by the image sensing device and the characterized noise pattern of the image sensing device.

7. The apparatus of claim 6, wherein the at least one processor is further configured to:
   shift the image generated by the image sensing device to compensate for the misalignment.

8. An apparatus, comprising:
   at least one processor in communication with an image sensing device, the at least one processor configured to:
   obtain a characterized noise pattern of the image sensing device;
   determine whether an image generated by the image sensing device is misaligned with an actual scene based on the characterized noise pattern of the image sensing device;
   in response to the image being determined to be misaligned with the actual scene, discard or re-align the image; and in response to the image being determined to be aligned with the actual scene, process the image to present to a user, wherein the at least one processor is further configured to determine whether the image generated by the image sensing device is misaligned with the actual scene by determine whether a noise pattern observed in the image generated by the image sensing device is shifted with respect to the characterized noise pattern of the image sensing device.

9. A system, comprising:
an image sensing device;
a display; and
at least one processor in communication with the image sensing device and the display, the at least one processor configured to:
- obtain a characterized noise pattern of the image sensing device;
- determine whether an image generated by the image sensing device is misaligned with an actual scene based on the characterized noise pattern of the image sensing device;
- in response to the image being determined to be misaligned with the actual scene, discard or re-align the image; and
- in response to the image being determined to be aligned with the actual scene, process the image to present to a user, wherein the at least one processor is further configured to determine whether the image generated by the image sensing device is misaligned with the actual scene by determine whether a noise pattern observed in the image generated by the image sensing device is shifted with respect to the characterized noise pattern of the image sensing device.

10. The system of claim 9, wherein in response to the image being determined to be aligned with the actual scene, the at least one processor is further configured to:
- apply predetermined correction terms to the image generated by the image sensing device to produce a noise pattern corrected image; and
- provide the noise pattern corrected image to the display configured to present the noise pattern corrected image to the user.

11. The system of claim 10, wherein the predetermined correction terms are stored in at least one computer-readable storage medium accessible to the at least one processor.

12. The system of claim 9, wherein in response to the image being determined to be misaligned with the actual scene, the at least one processor is further configured to:
- quantify a misalignment between a noise pattern observed in the image generated by the image sensing device and the characterized noise pattern of the image sensing device.

13. The system of claim 12, wherein the at least one processor is further configured to:
- shift the image generated by the image sensing device to compensate for the misalignment.

14. The system of claim 9, wherein the image sensing device, the display, and the at least one processor jointly operate as a part of an enhanced vision system.

15. The system of claim 14, wherein the enhanced vision system is adapted to be installed on a vehicle.

16. The system of claim 15, wherein the vehicle is an aircraft.

* * * * *